R. S. RILEY.
STEERING GEAR.
APPLICATION FILED SEPT. 3, 1908.

939,323.

Patented Nov. 9, 1909.
3 SHEETS—SHEET 1.

Witnesses:
Wills A. Burrowes
William H. Rivoir

Inventor:
Robert S. Riley
by his Attorneys
Howson & Howson

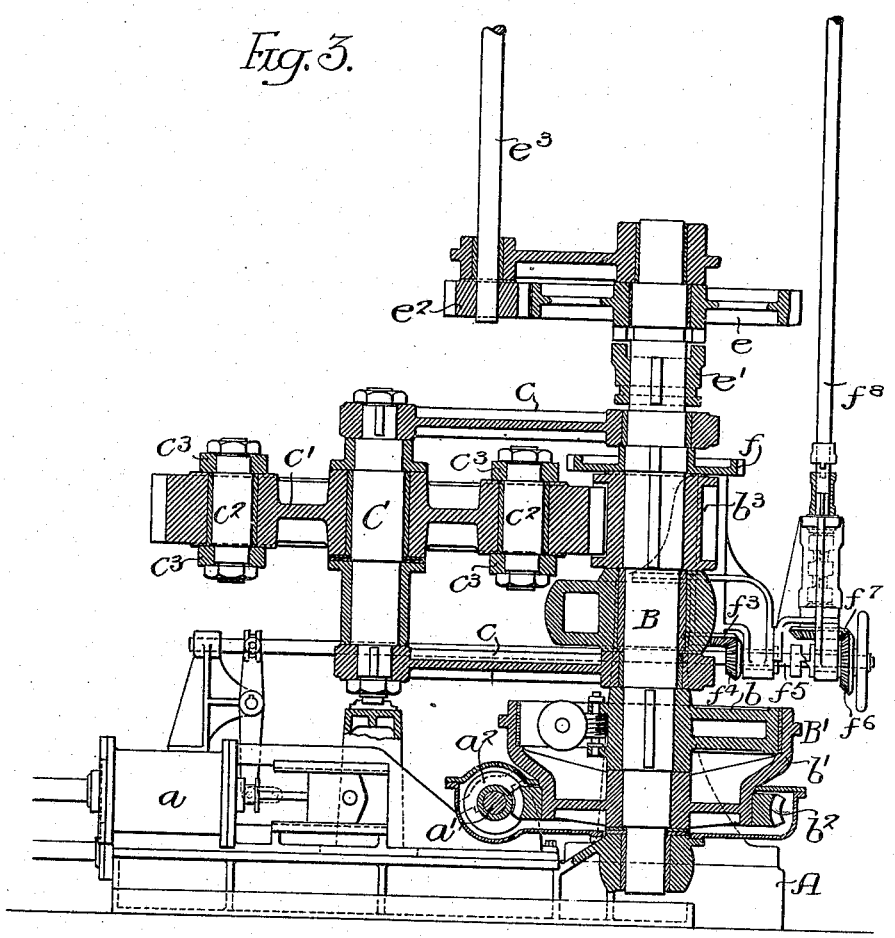

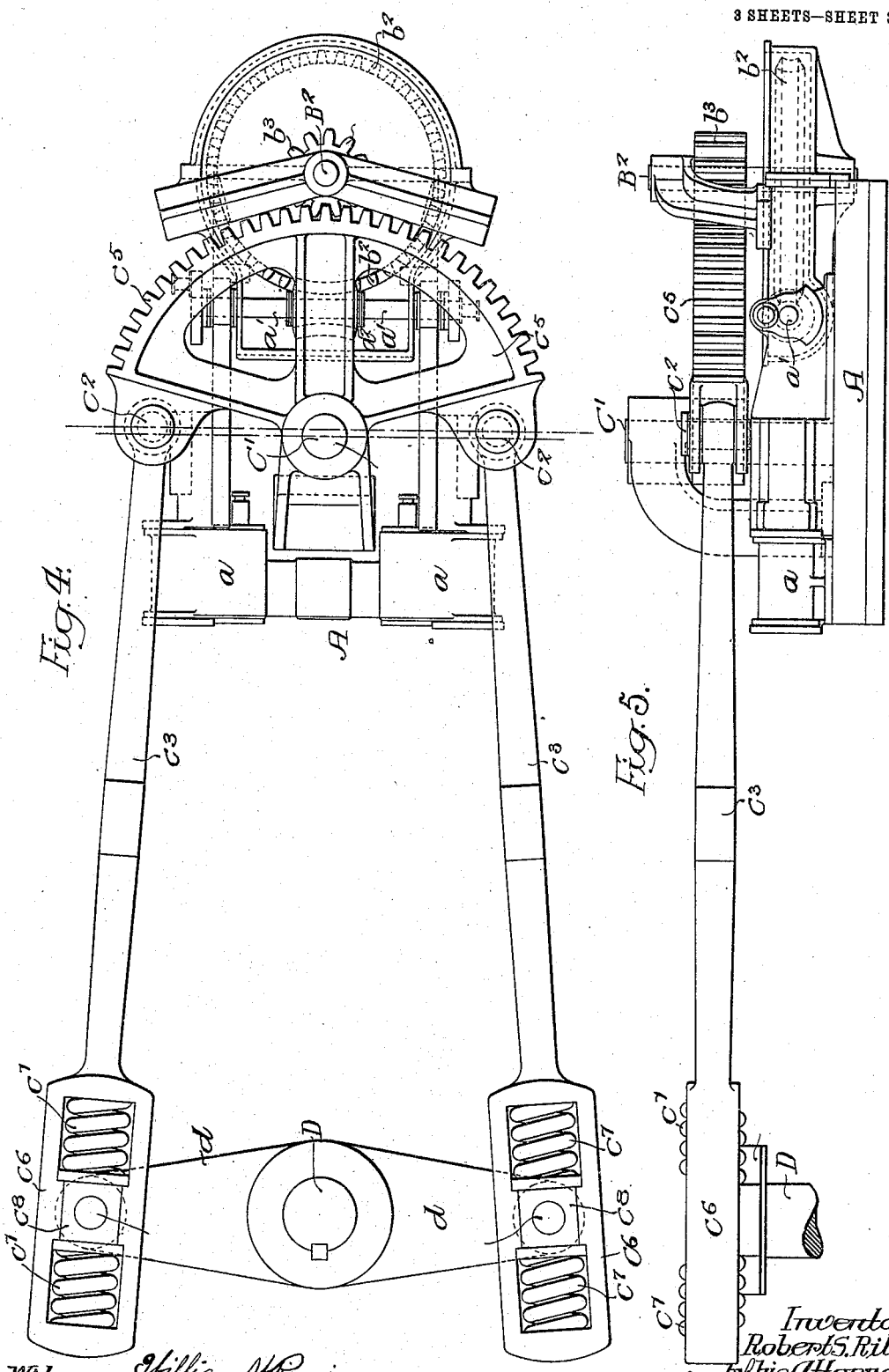

UNITED STATES PATENT OFFICE.

ROBERT S. RILEY, OF PROVIDENCE, RHODE ISLAND, ASSIGNOR TO WILLIAMSON BROS. COMPANY, OF PHILADELPHIA, PENNSYLVANIA, A CORPORATION OF PENNSYLVANIA.

STEERING-GEAR.

939,323.          Specification of Letters Patent.          Patented Nov. 9, 1909.

Application filed September 3, 1908. Serial No. 451,484.

*To all whom it may concern:*

Be it known that I, ROBERT S. RILEY, a citizen of the United States, residing in Providence, Rhode Island, have invented certain Improvements in Steering-Gears, of which the following is a specification.

One object of my invention is to provide mechanism for connecting a rudder with its engine or other operating motor, which shall have its parts so arranged as to permit such motor being of less power than has hitherto been required to perform the same work, and consequently allow of a material cutting down of the excess power hitherto possessed by the motor when operating the rudder at and in the vicinity of its amidships position.

Another object of the invention is to provide improved means for connecting the rudder with its operating engine or motor which shall be of such a nature as to require but relatively little power for moving the rudder when it is at or adjacent to its extreme displacement from the mid position.

A further object of the invention is to so mount the structure for actuating the links of my improved steering gear as to render possible its operation as heretofore noted.

These objects and other advantageous ends I secure as hereinafter set forth, reference being had to the accompanying drawings, in which:—

Figure 1:
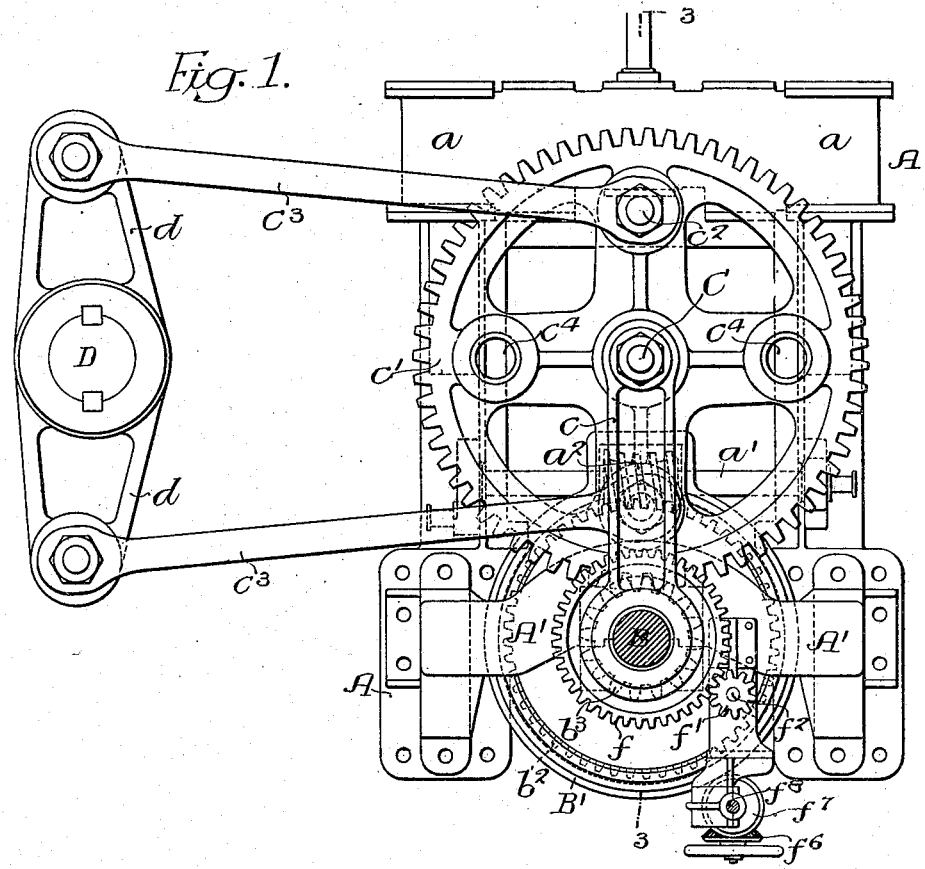
Figure 2:
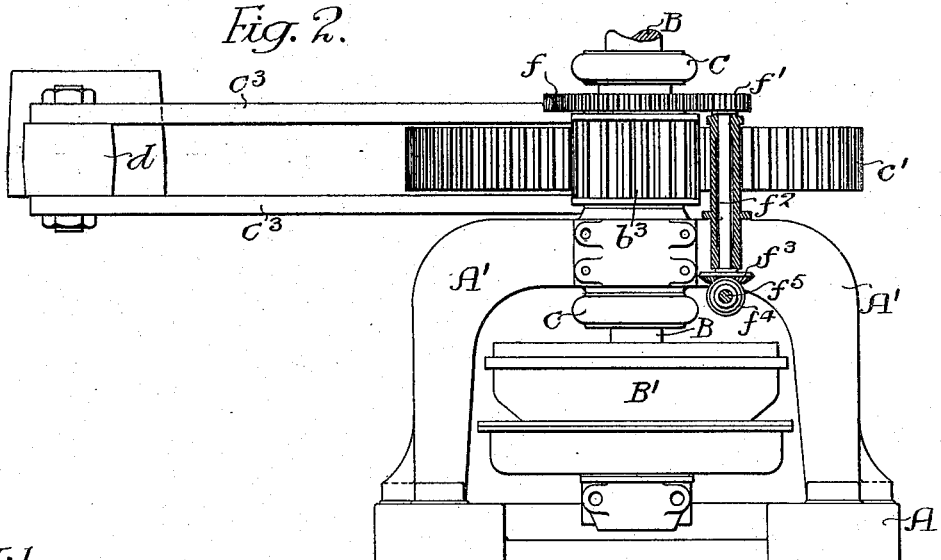

Figure 1, is a plan of a steering gear constructed according to my invention; Fig. 2, is a side elevation partly in section, of the device illustrated in Fig. 1; Fig. 3, is a vertical section taken on the line 3—3 Fig. 1, illustrating the detail construction of the device; and Figs. 4 and 5 are respectively a plan and a side elevation of a somewhat modified form of my invention.

In the above drawings A represents a base or supporting structure having engine cylinders $a$, $a$ and provided with suitable bearings for a crank shaft $a'$ to which the pistons of said engines are connected by rods, omitted for the sake of clearness. A relatively heavy bracket or standard A' is mounted on this base casting and provides a bearing for a vertically disposed shaft B, having keyed or otherwise fixed to it one member $b$ of a clutch B', whose second member $b'$ is fixed to or made part of a worm wheel $b^2$ and is loosely mounted on said shaft B.

A worm $a^2$ fixed to the engine crank shaft $a'$ meshes with the worm wheel $b^2$ so as to be capable of driving the shaft B through this latter and the clutch B'. The two members of the clutch are permanently connected to each other so as to be capable of slipping or moving relatively to each other when it is attempted to transmit through said clutch more than a predetermined amount of power.

Loosely mounted upon the shaft B are a pair of links $c$ in the ends of which are bearings for a shaft C carrying a gear wheel $c'$. This latter meshes with a pinion $b^3$ fixed to the shaft B and has mounted upon it at two points 180° from each other, a pair of pins $c^2$ serving as attaching means for two pairs of links $c^3$.

The rudder post to be turned is indicated at D and this has fixed to its upper end a pair of arms $d$, $d$, to the extremities of which the links $c^3$ are respectively connected;— the distance between the points of attachment of said links to the arms being greater than the distance between the pins $c^2$.

It will be noted that the gear $c'$ has in it two holes $c^4$ placed 90° from the holes for the reception of the pins $c^2$, so that when one portion of said gear becomes worn through continued use the pins may be changed from one set of holes to another in order to bring into action another and unworn portion of the gear.

Under working conditions the operation of the engines turns the crank shaft $a'$ through the worm $a^2$, the wheel $b^2$, and clutch B', causing turning of the shaft B, which transmits power through its pinion $b^3$ to the gear $c'$, thence through the links $c^3$ and arms $d$ to the rudder post D.

It will be understood that when the rudder is turned out of its normal or amidships position, the shaft C approaches the rudder post D owing to the peculiar and characteristic change of dimensions of the trapezoidal figure formed by the gear $c'$, links $c^3$ and the arms $d$, and such action is rendered possible by reason of the fact that said gear is supported upon the links $c$ which permit it to swing to a limited extent on the shaft B as an axis.

In the event of the rudder becoming jammed or in any way prevented from operation so that it can not be turned, one of the members of the clutch B' will slip, thus preventing the damage which would otherwise be caused to some part of the device.

The shaft B, in addition to the above parts, is provided with a gear wheel $e$ which may be coupled to it by suitable operation of the clutch member $e'$ so as to permit of its operation by hand through the agency of a pinion $e^2$ mounted on an auxiliary shaft $e^3$.

Apparatus for returning the controlling mechanism to its normal position and for giving visual indication of the position of the rudder, is connected to the shaft B through the medium of a gear $f$ which is fixed thereon and a pinion $f'$ meshing with said gear and carried on the shaft $f^2$ which also carries a bevel pinion $f^3$. This latter connects through a second bevel pinion $f^4$ to a shaft $f^5$, thence through pinions $f^6$ and $f^7$ with a shaft $f^8$ leading to said apparatus.

In the modified form of my invention shown in Figs. 4 and 5, I cause the pinion $b^3$ on the shaft $B^2$, which is driven from the worm wheel $b^2$, to mesh with a segmental gear $c^5$ supported on a shaft C so mounted in the supporting frame or base casting as to be free to turn. In this instance, however, the pins $c^2$ to which the links $c^3$ are connected, are attached to said segmental gear so that the line joining their centers extends to one side of the center line of the shaft $C'$; in the present instance on that side thereof farthest from the rudder post D. Moreover, the links $c^3$ have enlarged ends $c^6$, in each of which are mounted a pair of springs $c^7$, and between each pair of springs I place blocks $c^8$ connected to the ends of the arms $d$ belonging to the rudder post D. As a consequence of this arrangement of parts, it is, as before, possible for the trapezoidal figure formed by the segmental gear $c^5$, links $c^3$ and arm $d$ to change its dimensions when causing revolution of the rudder post, for it will be seen that this is permitted by the above noted form of connection and support of the segmental gear $c^5$, as well as by reason of the flexible connections between the arms $d$ and the links $c^3$.

It will of course be understood that an electric motor or any other source of power may be substituted for the engines $a$ without departing from my invention, and that said engines, with their immediately associated parts, are more or less diagrammatically shown, since their detail construction is well known to the art.

In both of the forms of my invention illustrated in the drawings, it is to be noted that the figure formed by the segments $c'$ or $c^5$, the links $c^3$ and the arms $d$, is a trapezoid when the parts are in the relative positions illustrated. When, however, these parts have been moved from such normal positions, they form a trapezium, and as a result, there is required a movement of the gear $c'$ or $c^5$ through an arc of about 70° in order to obtain a maximum movement of about 45° of the rudder post. When the parts approach their positions of maximum displacement from the normal, one of the links $c^3$ and the segmental gear form a toggle, and since the maximum power for operating the rudder is required while it is being given its greatest displacement from the normal, the power actually required from the engine for so moving the rudder post is much less with my novel arrangement of parts, than would otherwise be the case. It would, however, be impossible to take advantage of such an assemblage of connecting members as that described without providing some means whereby the center of the line joining the two pins $c^2$ is permitted to approach the center line of the rudder post when the rudder is operated from its normal position, and while it is obvious that this end may be accomplished in a number of ways, the two arrangements illustrated by me now appear to be the most practical ones. Consequently I find that by the use of my improved steering gear it is possible to operate a rudder of a given size with a much smaller engine or motor than has heretofore been the case, or to move the rudder more quickly with the same sized motor. I also find that when near its amidships position the rudder can be moved more rapidly and with more economical use of steam, due to the fact that the engine is connected to said rudder by a ratio of gearing which is better proportioned for the small power required at this point.

While the springs $c^7$, in that form of my invention shown in Figs. 4 and 5, serve to allow for any movement of the blocks $c^8$ which may be necessary to accomplish the objects above noted, they also serve to absorb any shocks transmitted from the rudder due either to blows given by waves or solid objects.

I claim:

1. Rudder operating mechanism including a source of power, with a series of elements, connected to form a trapezoidal figure, and interposed between said source of power and the rudder, so as to constitute means for increasing the leverage on the rudder, one of the elements forming an end of said trapezoidal figure being capable of being moved bodily toward and from the other end thereof.

2. Rudder operating mechanism including a source of power, and a series of elements connected to form a trapezoidal figure interposed between said source and the rudder, with means for permitting the element forming one side of said figure to bodily approach another side thereof when the device is operated from its normal position.

3. In rudder operating mechanism the combination of a source of power, and a series of elements connected to form a trapezoid interposed between said source of power and the rudder, said mechanism including a device capable of permitting a change in certain of the dimensions of said figure when such change is required by the operation of the rudder.

4. The combination of a rudder head, arms connected thereto, a rotatably mounted toothed segment movable relatively to the rudder head toward and from the same, links connecting the toothed segment and said arms, the distance between the points of connection of the links to the segment being less than the distance between the points of connection of the arms to the rudder head, an operating shaft, and mechanism including worm gearing connecting said shaft with the toothed segment.

5. The combination in a rudder operating mechanism of a rotatable rudder head and a rotatable segment mounted to be capable of relative bodily movement toward and from each other, a source of power connected to said segment, and means connecting said segment and the rudder head, said parts being arranged to permit an angular movement of said segment to cause a different angular movement of the rudder head.

6. The combination of a rudder post having arms, a toothed structure, links connecting said structure to said arms, means for supporting said structure so as to permit it to move toward or from the rudder post, a source of power, and means connecting said source of power with said toothed structure, said means including a clutch capable of slipping when more than a predetermined load is applied to it.

7. The combination of a rudder post having arms, a toothed structure, links connecting said structure with said arms, a shaft, a pinion thereon meshing with the teeth of said structure, links mounted on said shaft and supporting the toothed structure so as to permit it to move bodily toward or from the rudder post, and a source of power for actuating said shaft.

8. The combination of a rudder post having arms, a toothed structure, links connecting said structure with said arms to form a trapezoidal figure, a shaft, a pinion thereon meshing with the teeth of said structure, links mounted on said shaft and supporting the toothed structure so as to permit it to move toward or from the rudder post, a source of power, and means for connecting said source of power to said shaft, the same including a clutch capable of slipping when more than a predetermined load is applied to it.

9. The combination of a rudder post having arms, a toothed structure, links connecting said structure with said arms to form a trapezoidal figure, a shaft, a pinion thereon meshing with the teeth of said structure, links mounted on said shaft and supporting the toothed structure so as to permit it to move toward or from the rudder post, a source of power, and means for connecting the same to said shaft, said means including a worm, a worm gear, and a clutch capable of slipping when more than a predetermined load is applied to it.

10. The combination of a rudder post having a pair of arms, a driving shaft connected to a source of power, a pinion thereon, a gear meshing with said pinion, links connecting said gear with the arms of the rudder post, said gear being adjustable to bring various sets of teeth into mesh with said pinion.

In testimony whereof, I have signed my name to this specification, in the presence of two subscribing witnesses.

ROBERT S. RILEY.

Witnesses:
 MARGARET MCCULLOUGH,
 E. S. MAYNE.